United States Patent [19]

Fitzgerald et al.

[11] Patent Number: 4,777,619
[45] Date of Patent: Oct. 11, 1988

[54] METHOD OF ASSURING A PROPER COMPUTER SUBSYSTEM CONFIGURATION

[75] Inventors: Thomas J. Fitzgerald, Cambridge, Mass.; Albert T. McLaughlin, Hudson, N.H.

[73] Assignee: Honeywell Bull, Inc., Minneapolis, Minn.

[21] Appl. No.: 32,422

[22] Filed: Mar. 30, 1987

[51] Int. Cl.$^4$ .................... G06F 11/00; G01R 31/28
[52] U.S. Cl. ........................................ 364/900; 371/15
[58] Field of Search ... 364/200 MS File, 900 MS File, 364/550; 371/15, 20

[56] References Cited

U.S. PATENT DOCUMENTS

| | | | |
|---|---|---|---|
| 4,025,768 | 5/1977 | Missios et al. | 364/900 X |
| 4,357,703 | 11/1982 | Van Brunt | 371/15 |
| 4,365,334 | 12/1982 | Smith et al. | 371/20 X |
| 4,556,840 | 12/1985 | Russell | 371/15 X |
| 4,697,140 | 9/1987 | Saito et al. | 371/15 X |
| 4,701,920 | 10/1987 | Resnick et al. | 371/15 X |

*Primary Examiner*—Thomas M. Heckler
*Attorney, Agent, or Firm*—George Grayson; John S. Solakian; Lewis P. Elbinger

[57] ABSTRACT

A method and apparatus for determining if matching units of an electronic system or a subsystem are assembled includes a single scratchpad memory which is addressed by the units on alternate cycles. A microprogram stored in one unit operates in synchronism with a microprogram in the other unit to write into and to test the contents of a location in scratchpad memory to determine if the two units would be operational with each other during normal operation.

13 Claims, 6 Drawing Sheets

DATA PROCESSOR UNIT 1

DATA PROCESSOR UNIT 1

ADAPTER 10 OR 10a

METHOD OF ASSURING A PROPER COMPUTER SUBSYSTEM CONFIGURATION

BACKGROUND OF THE INVENTION

1. Field of Use

This invention relates to the data processing field and more particularly to the identification of computer subsystems comprised of several assemblies.

2. Description of the Prior Art

As an example, data processing systems connect peripheral devices to a peripheral controller via a peripheral adapter. The adapter includes logic to match the device logic to the controller logic. The controller in turn is connected to a central processing unit, a main memory or even possibly an input/output processor which in turn may be connected to the main memory or the central processing unit.

Data processing systems of the 1950's would have a peripheral controller and a matching peripheral adapter in separate cabinets. They would be cabled together and the peripheral controller would be cabled to a memory cabinet or a central processor cabinet.

In the 1960's peripheral controllers and their matching peripheral adapters were mounted in drawers. A single cabinet would have a number of drawers including peripheral controller drawers and peripheral adapter drawers. The matching controllers and adapters were connected by ribbon cable terminating in edge connectors.

In the 1970's controller logic was mounted on a single printed circuit board and its matching adapter was mounted on an adjacent board. They both plugged into a printed circuit backboard.

In the 1980's controller logic is mounted on a single printed circuit board called a "motherboard" and the adapters called "daughterboards" are plugged into connectors on their corresponding motherboard. During factory assembly very often the incorrect daughterboards are plugged into motherboards, and the system problems generated are not found until the system test operation. This was not a problem in the past since either cabinets, drawers or separate boards were readily matched since they were large and readily identified and there weren't too many variations of design. However present day designs may have many vendor's peripheral devices with their special adapter connected to a controller. Also a controller may have a number of adapters (daughterboards) plugged into it. In addition, there may be many versions of the controller board (e.g., 16 bit wide data path, 32 bit wide data path, etc.).

OBJECTS OF THE INVENTION

Accordingly it is an object of the invention to be able to readily identify and verify that the correct subassemblies are put together to comprise a computer subsystem.

SUMMARY OF THE INVENTION

An example which portrays the invention may be a peripheral subsystem which includes a controller, an adapter and a number of peripheral devices. The controller includes a microprogram controller which addresses a read only memory which stores the microprogram that controls the controller operation.

The adapter includes its microprogram controller which addresses its read only memory which stores its microprogram that controls the adapter operation.

The controller includes a scratchpad memory which is addressable by both the controller and adapter logic.

The controller microprogram loads a predetermined location in the scratchpad memory with characters identifying the controller. The adapter microprogram reads the characters in the scratchpad locations and compares them with the characters in the adapter microprogram identifying the adapter.

If there is a match then the adapter and controller are synchronized by the adapter writing predetermined characters into the scratchpad location when certain Quality Logic Tests (QLT) are completed by the adapter. The controller reads these predetermined characters to perform its QLT's.

If there was not a match, that is the adapter is not compatible with the controller, then a counter which was set with a predetermined count, counts down as the controller microprogram loops, looking for a match. When the counter reaches zero, an error code is written into a scratchpad memory location which stores indications of error conditions.

DESCRIPTION OF A PREFERRED EMBODIMENT

Figure 1:
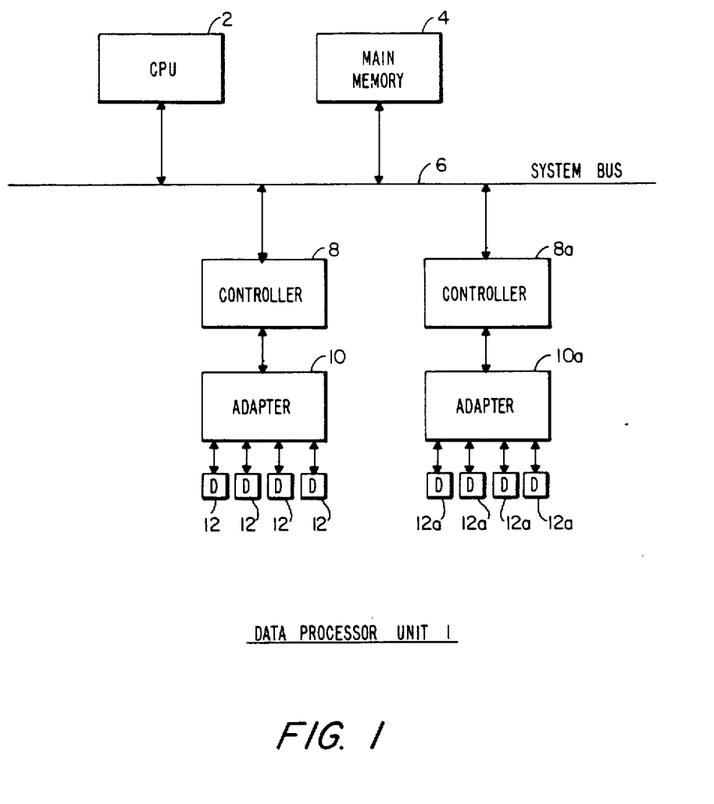
FIG. 1 is a block diagram of a typical system.

FIG. 1 shows a typical data processing system 1 with a number of subsystems, typically a central processor unit 2, a main memory 4, a peripheral controller 8 and a peripheral controller 8a, all coupled in common to a system bus 6. A number of peripheral devices 12 are coupled to an adapter 10 which is in turn coupled to controller 8. Similarly a number of peripheral devices 12a are coupled to an adapter 10a which is in turn coupled to controller 8a.

Although this invention may be used to identify any number of subsystems or printed circuit boards that make up a system or a subsystem, a typical peripheral controller with its adapter is described. Assume controller 8 processes 24 bit words and controller 8a processes 32 bit words. Also assume that adapter 10 processes 24 bit words and adapter 10a processes either 24 bit or 32 bit words. Adapter 10a, therefore is operative with both controllers 8 and 8a, whereas adapter 10 is operative with controller 8 but not operative with controller 8a. The apparatus and method for verifying that the peripheral subsystems are operative is described herein.

Figure 2:
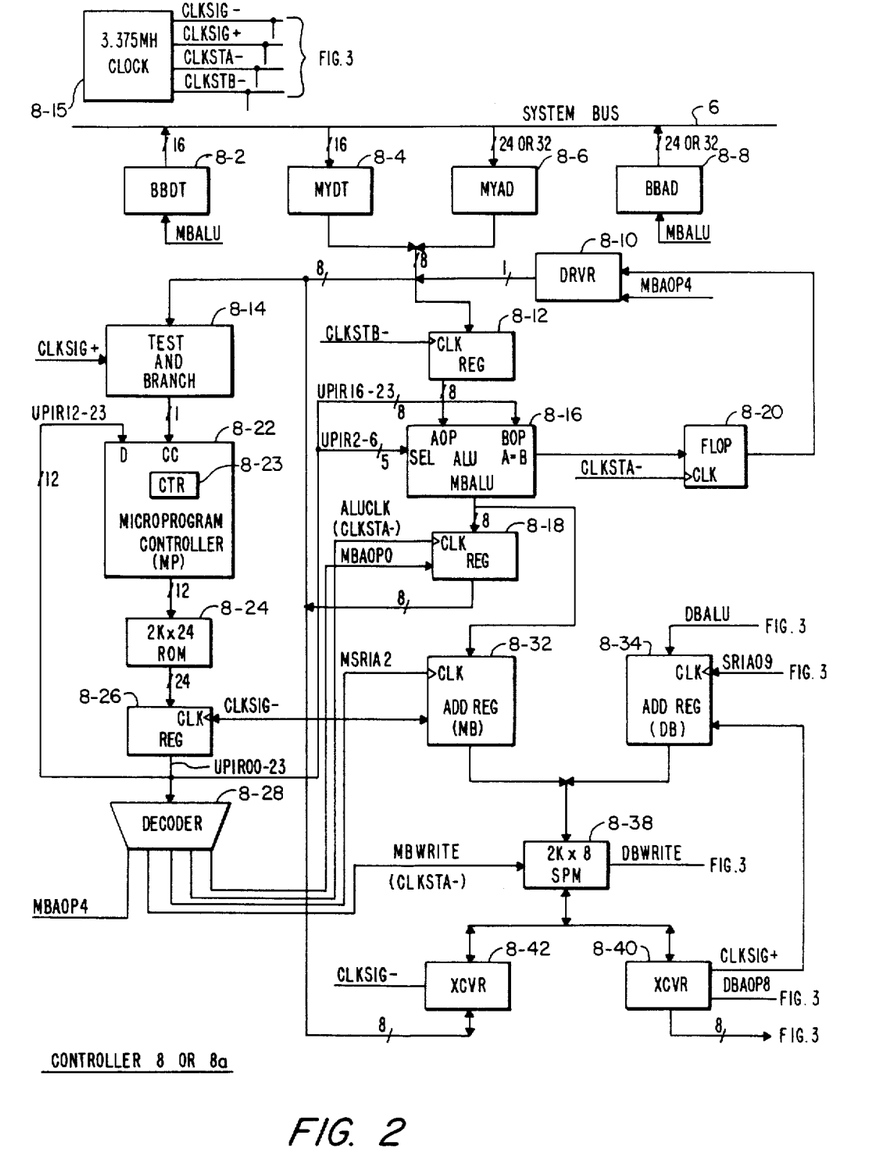
FIG. 2 shows the portions of the controller logic of the invention.

FIG. 2 is a block diagram of the logic portions of both controllers 8 and 8a that show the invention.

A 12 bit microprogram controller (MP) 8-22, typically an AM2910 logic element manufactured by Advanced Microdevices Inc., along with firmware stored in a 2K×24 bit read only memory (ROM) 8-24 controls the operation of controllers 8 or 8a. MP 8-22 addresses ROM 8-24 locations storing firmware microwords which are read out and stored in a 24 bit local register 8-26 under control of clock signal CLKSIG− and applied to a decoder 8-28. Decoder 8-28 and register 8-26 distribute a number of control signals which control the operation.

Data and address information are received from system bus 6 by a 16 bit MYDT register 8-4 and a 24 bit or 32 bit MYAD register 8-6 respectively. Data and address information are sent out over system bus 6 by a 16 bit BBDT register 8-2 and a 24 bit or 32 bit BBAD register 8-8 respectively. For this example assume that controller 8 processes 24 bit addresses and controller 8a processes 32 bit addresses.

An arithmetic logic unit (ALU) 8-16, typically 74S181's manufactured by Texas Instruments receives an A operand (AOP) from an 8 bit register 8-12 and an 8 bit B operand (BOP) which would be a firmware constant for this invention, from register 8-26. The A operand is loaded into register 8-12 by clock strobe signal CLKSTB-. A number of signals UPIR2 through 6 from register 8-26 determine the arithmetic function the ALU 8-16 will perform on the A and B operands. If the register 8-26 signals call for a compare operation, then the result of the comparison of the A and B operands would be reflected in a signal to set a flop 8-20 if the operands were equal. A test and branch instruction may then test this result.

The test and branch instruction would result in the output signal of flop 8-20 being applied to test and branch 8-14. The test and branch 8-14 would apply a signal to the CC input terminal of MP 8-22. The MP 8-22 would then be responsive to the branch portion of the microword stored in register 8-26 to generate the branch address if the test is true.

The BALU port of the ALU 8-16 provides the output which may be stored in an 8 bit register 8-18, or an 8 bit scratchpad address register 8-32. The operand in register 8-18 may be recirculated through the A operand port via register 8-12, written into a location in a scratchpad memory (SPM) 8-38 via a transceiver 8-42 or applied to test and branch 8-14.

The SPM 8-38 is addressed by the contents of registers 8-32 and 8-34 on alternate clock cycles in accordance with the state of clock signal CLKSIG. Clock signal CLKSIG− enables the output of register 8-32 and clock signal CLKSIG+ enables the output of register 8-34. Clock signals CLKSIG− and CLKSIG+ and clock strobe signals CLKSTB- and CLKSTB+ are generated by a 3.375 Megahertz clock logic 8-15. The address stored in register 8-34 is received from the adapters 10 or 10a, whereas the address stored in register 8-32 is developed internally by the controllers 8 or 8a. The SPM 8-38 address is applied to register 8-32 via ROM 8-24, register 8-26, B operand port of the ALU 8-16, and the MBALU port. Signal MSRIA2 from decoder 8-28 loads register 8-32 and signal SRIA09 from a decoder 10-18, FIG. 3, loads register 8-34. Signal ALUCLK which controls the loading of register 8-18 is generated at clock time CLKSTA− by selected microword bits from register 8-26. Signal MBA0P0 from decoder 8-28 enables the output of register 8-18.

Data transfer between the adapters 10 or 10a and the SPM 8-38 is accomplished via a transceiver 8-40. Signal DBAOP8 from decoder 10-18 indicates the direction of the data transfer and signal CLKSIG- enables the output of XCVR 8-40.

A microword indicating a SPM 8-38 write operation results in decoder 8-28 generating signal MBWRITE or decoder 10-18 generating signal DBWRITE for the controller 8 or 8a microword or the adapter microword 10 or 10a respectively. Data and address information from system bus 6 are stored in register 8-12, 8 bits at a time, from registers 8-4 and 8-6. Data and address information are stored in registers 8-2 and 8-8 from the BALU port of ALU 8-16.

Figure 3:
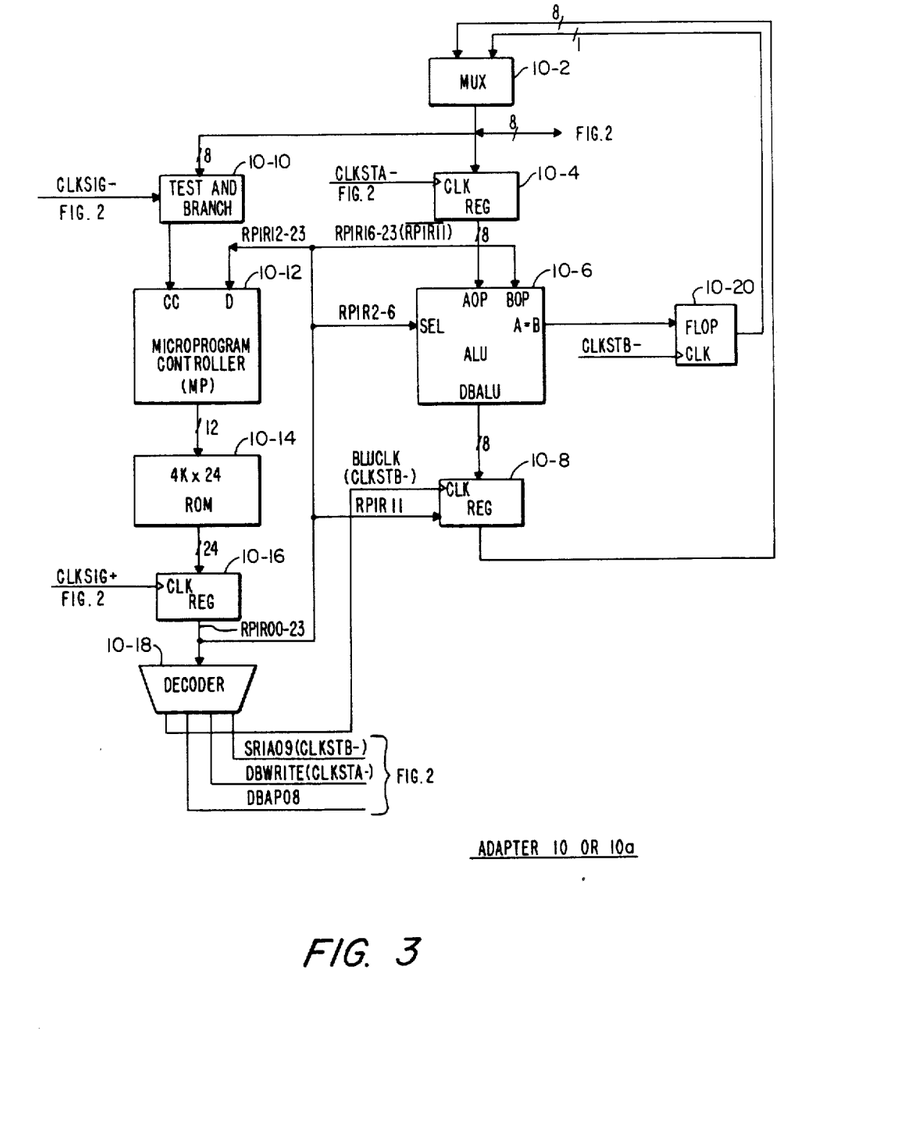
FIG. 3 shows the portion of the adapter logic of the invention.

FIG. 3 is a block diagram of the logic portions of adapters 10 or 10a. A 12 bit microprogram controller (MP) 10-12, typically the AM2910 along with the firmware stored in a 4K×24 bit ROM 10-14 controls the operation of adapters 10 or 10a. MP 10-12 address ROM 10-14 locations which store microwords which are read out and stored in a 24 bit local register 10-16 under control of clock signal CLKSIG+ and applied to a decoder 10-18. Register 10-16 and decoder 10-18 distribute a number of signals to control the operation. Since the adapter 10 or 10a logic addresses the SPM 8-38, FIG. 2, on alternate clock cycles, the firmware of both the controller 8 or 8a and the adapter 10 or 10a operate in synchronism.

An ALU 10-6 receives A operand information from an 8 bit register 10-4 and B operand constants from the register 10-16. Register 10-4 is loaded under control of clock strobe signal CLKSTB+. Signals from the DBALU output port are stored in an 8 bit register 10-8 under control of signal BLUCLK or stored in address register 8-34.

Signal BLUCLK is generated at clock time CLKSTB− by decoder 10-18. Address register 8-34 is loaded under control of signal SRIA09 via the DBALU port of ALU 10-6, the B operand port, register 10-16 and ROM 10-14. The output signals of register 10-8 are applied to the A operand port of ALU 10-6 via a MUX 10-2 and an 8 bit register 10-4 the output of register 10-8 is enabled by signal RPIR11 from register 10-16. Control signals RPIR16 through 23 are applied directly to the B operand port. Control signals RPIR2 through 6 from the register 10-16 determine the mode of operation of the ALU 10-6. The results of an equal comparison between the A and B operands set a flop 10-20.

A test and branch microword will result in MUX 10-2 applying the flop 10-20 output signal to test and branch 10-10 which in turn activates the CC input terminal of MP 10-12. MP 10-12 is then responsive to the 12 bit branch address to cause the ROM 10-14 to next read out the contents of the location specified by the branch address instead of the next sequential address if the test is true.

Figure 4:
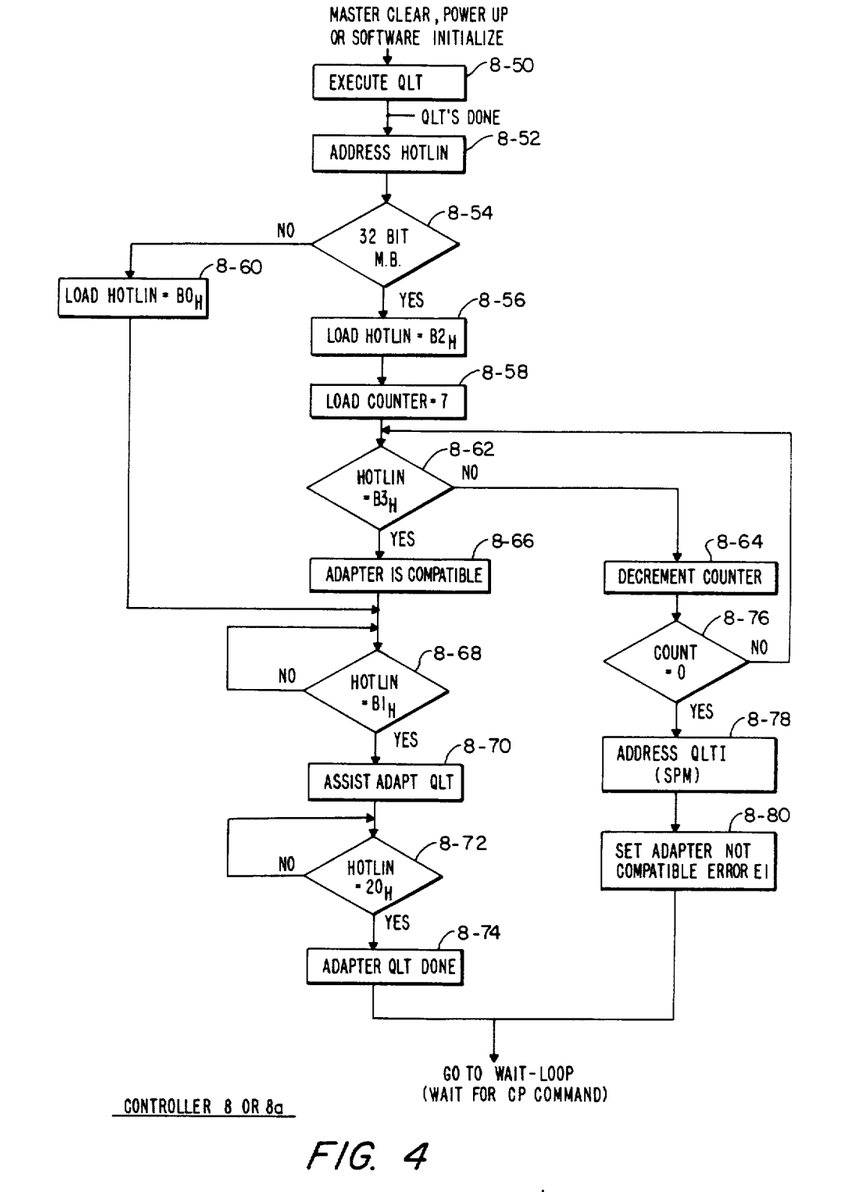
FIG. 4 shows a block diagram of the controller firmware.

FIG. 4 shows a block diagram of the firmware operative in the controller 8 or 8a.

Figure 5:
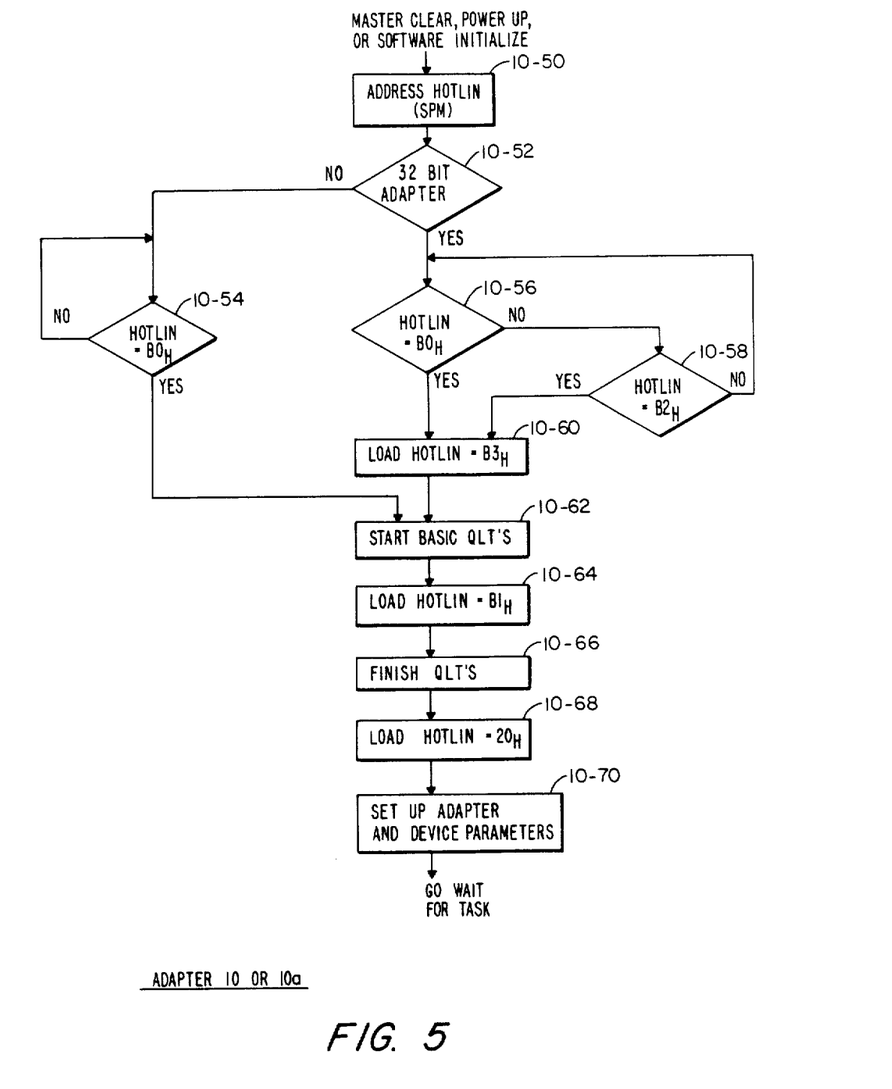
FIG. 5 shows a block diagram of the adapter firmware.

FIG. 5 shows a block diagram of the firmware operative in the adapter 10 or 10A.

Both the controller and adapter firmware are synchronized because they each control the addressing of SPM 8-38 and the loading of the ALU output registers 8-18 and 10-8 on alternate cycles. As an oversimplification the controller firmware will write a constant in a location in SPM 8-38 identifying the kind of controller as one that processes either a 24 bit words or a 32 bit words. On the next clock cycle the adapter firmware addresses that SPM 8-38 location to read the constant and indicate that the adapter 10 or 10a will be operative or inoperative with the controller 8 or 8a.

Referring to FIG. 4, the firmware sequence is initiated by a master clear, a power up or a software initialization.

Block 8-50 performs a quality logic test (QLT) which exercises the logic of the controller 8 or 8a. When the QLT is successfully completed, block 8-52 sends an address of a location in SPM 8-38, called HOTLIN to register 8-32.

If the controller is a 24 bit word subsystem then block 8-60 loads hexadecimal B0 into HOTLIN. If the controller is a 32 bit word subsystem, then block 8-56 loads hexadecimal B2 into HOTLIN. Decision block 8-54 is not a firmware word but is inserted for ease of description.

The address of HOTLIN is stored in register 8-32 via the MBALU port of the ALU 8-16, the B operand port, register 8-26 and ROM 8-24. The data words hexadecimal B0 or hexadecimal B2 are loaded into scratchpad memory 8-38 via XCVR 8-42, register 8-18, MBALU port of ALU 8-16, B operand port, register 8-26 and ROM 8-24. Decoder 8-28 generates the MBWRITE signal if block 8-56 loaded hexadecimal B2 into scratchpad memory 8-38. Then an internal counter 8-23 in MP 8-22 is set to hexadecimal 7 in block 8-58. Counter 8-23 is decremented in block 8-64 for each cycle that HOTLIN does not receive a response from the adapter 10 or 10a firmware in FIG. 5, that is, decision block 10-54 recycles or the combination of decision blocks 10-56 and 10-58 recycle.

Referring to FIG. 5, after the master clear, the power up or the software initialize sequences, block 10-50 loads register 8-34 with the address the HOTLIN location in SPM 8-38. If this is the 24 bit adapter 10 then fictitious decision block 10-52 tests decision block 10-54 which examines the contents of the HOTLIN location of SPM 8-38. The two hexadecimal characters stored in HOTLIN are read from SPM 8-38 and applied to the A operand port of ALU 10-6 via transceiver 8-40, MUX 10-2 and register 10-4. The constant B0 identifying adapter 10 is applied to the B operand port from register 10-16 and ROM 10-14.

If the hexadecimal B0 was read from HOTLIN and compared with hexadecimal B0 from register 10-16 in decision block 10-54, then flop 10-20 is set. When the test and branch microword is read into register 10-16, then MUX 10-2 applies the flop 10-20 output signal to test and branch 10-10. The output signal applied to input terminal CC of MP 10-12 causes the branch address to address ROM 10-14 via register 10-16 and MP 10-12. This addresses block 10-62 to start the adapter 10 QLT. If in decision block 10-54 the contents of location HOTLIN was not hexadecimal B0 then decision block 10-54 would remain in a loop indicating that adapter 10 is not compatible with controller 8a. Counter 8-23 is decremented in block 8-64 and after seven loop cycles an error indication is stored in an error location of SPM 8-38.

Then referring to FIG. 4 decision block 8-62 tests HOTLIN for hexadecimal B3. Since HOTLIN does not contain hexadecimal B3, the firmware would loop through block 8-64 which decrements the counter 8-23 and decision block 8-76 which tests the contents of counter 8-23 for hexadecimal 00. When the counter 8-23 has counted down to hexadecimal 00, decision block 8-76 branches to block 8-78.

Block 8-78 addresses a QLTI location in SPM 8-38. Then block 8-80 writes a hexadecimal E1 into location QLTI indicating an "adapter not compatible" error.

The firmware now goes into a wait-loop for an MP 8-22 command.

Referring to FIG. 5, for adapter 10a, decision block 10-56 tests the HOTLIN location for hexadecimal B0 and decision block 10-58 tests HOTLIN for hexadecimal B2. If HOTLIN stores either hexadecimal B0 or B2, then hexadecimal B3 is loaded into HOTLIN. If neither hexadecimal B0 or B2 are stored in HOTLIN, then the firmware will loop indicating the controller has failed its QLT and cannot continue. The controller will write the correct code for this failure into location QLTI in block 8-80 and go into the wait-loop. If block 10-60 loads hexadecimal B3 into HOTLIN then in FIG. 4, decision block 8-66 indicates that the adapter 10 or 10a is compatible. Decision block 8-68 now tests HOTLIN for hexadecimal B1 which indicates that the adapter 10 or 10a has started its QLT.

Referring to FIG. 5, once the basic QLT's are started by block 10-62, then block 10-64 loads hexadecimal B1 in HOTLIN. Referring to FIG. 4, decision block 8-68 branches to block 8-70 when it reads hexadecimal B1 in HOTLIN.

Block 8-70 starts the assist adapter QLT and when block 10-66 in FIG. 5 finishes the QLT's, block 10-68 loads HOTLIN with hexadecimal 20. Block 10-70 sets up the adapter 10 or 10a and device 12 or 12a parameters and the firmware waits for a task.

Referring to FIG. 4, decision block 8-72 tests HOTLIN for hexadecimal 20 to branch to block 8-74 to indicate that the adapter QLT is completed. The firmware then goes into the wait-loop mode.

Figure 6:
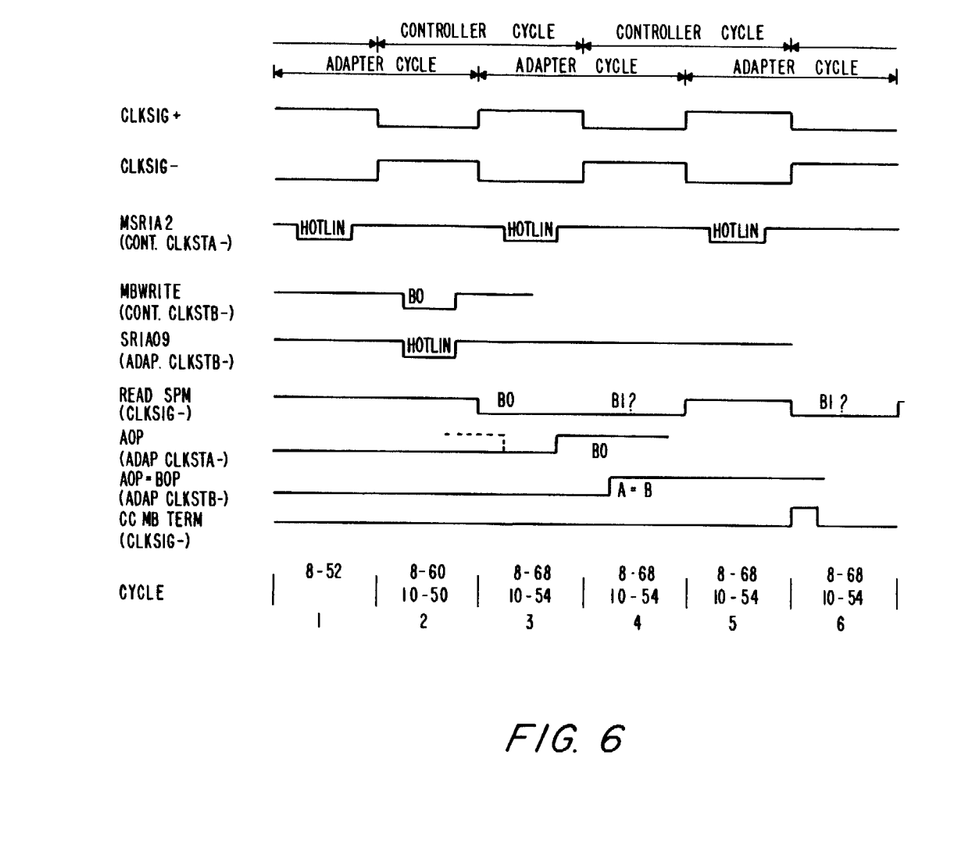
FIG. 6 shows a timing diagram of the sharing of the scratchpad memory in the controller by both the controller and adapter.

FIG. 6 shows a timing diagram of some of the logic including the sharing of SPM 8-38 and the testing of the ALU 10-6 for the A operand equaling the B operand. Six cycles of operation are shown. A cycle is defined as the time between changes of state of complementary clock signals CLKSIG+ and CLKSIG−. The adapter cycle includes two cycles of operation. During the first cycle of operation clock signal CLKSIG− is low. During the second cycle of operation clock signal CLKSIG− is high. The two cycles of operation that make up the controller cycle include the first cycle with clock signal CLKSIG+ low and the second cycle with clock signal CLKSIG+ high. Note the overlap of one cycle between the adapter cycle and the controller cycle.

The controller scratchpad address register 8-32 may be loaded during each first cycle of operation of the adapter cycle, which is also each second cycle of operation of the controller cycle. The addressed location is either read from or written into during the next cycle of operation. This makes the SPM 8-38 available to the adapter and controller on alternate cycles of operation.

Referring to FIG. 6, block 8-52, FIG. 4, is processed during cycle 1 by loading the address of HOTLIN in address register 8-32 on the rise of signal MSRIA2 which is timed by clock signal CLKSTA−.

Blocks 8-60 and 10-50 are processed during cycle 2. For block 8-60 hexadecimal B0 is written into the SPM 8-38 location HOTLIN specified by the contents of register 8-32 under control of the write signal MBWRITE which is timed by clock signal CLKSTB−. For block 10-50 the address of HOTLIN is loaded into address register 8-34.

Blocks 8-68 and 10-54 are processed during cycle 3. For block 8-68, the contents of HOTLIN hexadecimal B0 are read from SPM 8-38 at the location specified by the contents of register 8-34 and loaded into register 10-4 on the rise of clock signal CLKSTA−.

During cycle 4 block 10-54 is processed by the ALU 10-6 comparing the A operand, hexadecimal B0 with the B operand constant, in this case assume hexadecimal B0, the ALU 10-6 A equals B signal will set flop 10-20 on the fall of clock signal CLKSTB-. Block 8-68 reads the contents of HOTLIN and tests in the ALU 8-16 if it is hexadecimal B1. In this case it is not B1 since block 10-64 has not been processed.

During cycle 5 block 8-68 again loads register 6-32 with the address of HOTLIN. Block 10-54 is in a wait mode.

During cycle 6 MB 10-12 receives the signal to use the branch address of the test for zero instruction which was executed during cycle 4. Also block 8-68 again reads the contents of HOTLIN looking for hexadecimal B1.

While the invention has been shown and described with reference to the preferred embodiment thereof, it will be understood by those skilled in the art that the above and other changes in form and detail may be made therein without departing from the spirit and scope of the invention.

What is claimed is:

1. A method of determining whether or not a proper configuration of units is assembled and tested, said method comprising the steps of:
   A. writing in a first location of memory, by a first unit, a first constant identifying said first unit;
   B. loading a counter by said first unit with a first predetermined count;
   C. testing the contents of said first location, by said first unit, for a second constant and decrementing said counter after each test in which said second constant is not stored in said first location;
   D. reading the contents of said first location by a second unit and writing said second constant into said first location when the contents of said first location contains said first constant;
   E. testing the contents of said first location by said first unit for said second constant and determining that said second unit is compatible with said first unit when said second constant is read from said first location;
   F. testing the contents of said counter for a second predetermined count after each cycle in which said counter is decremented and determining that seid first and second units are not compatible if a second predetermined count is reached.

2. The method of claim 1 further comprising the steps of:
   G. starting said second unit quality logic test (QLT);
   H. writing a third constant into said first location by said second unit;
   I. reading the contents of said first location by said first unit and testing for said third constant;
   J. assisting said QLT by said first unit after reading said third constant;
   K. writing a fourth constant into said first location by said second unit to indicate that said QLT is completed;
   L. testing the contents of said first location by said first unit for said fourth constant to indicate that said QLT is completed.

3. The method of claim 1 further comprising the steps of:
   M. addressing a second location by said first unit and storing a fifth constant indicating that said first and said second units are not compatible if said second predetermined count is readied.

4. The method of claim 2 wherein said first constant is hexadecimal B2.

5. The method of claim 2 wherein said second constant is hexadecimal B3.

6. The method of claim 2 wherein said third constant is hexadecimal B1.

7. The method of claim 2 wherein said fourth constant is hexadecimal 20.

8. The method of claim 3 wherein said first unit processes 32 bit words and said second unit processes 32 bit words.

9. A method of determining whether or not a proper configuration of units is assembled and tested comprising the steps of:
   A. writing in a location of memory by a first unit, a first constant identifying said first unit;
   B. testing the contents of said location by a second unit for said first constant to determine that said first and second units are compatible when said first constant is read from said location;
   C. testing the contents of said location by said first unit for a second constant;
   D. starting a QLT by said second unit;
   E. writing said second constant in said location by said second unit indicating that said QLT is started;
   F. testing the contents of said location by said first unit until said second constant is found;
   G. assisting said QLT by said first unit;
   H. testing the contents of said location by said first unit for a third constant;
   I. completing said QLT by said second unit;
   J. writing in said location said third constant by said second unit;
   K. testing the contents of said location by said first unit for said third constant and indicating that said first and second units are compatible and tested when said third constant is read from said location.

10. The method of claim 9 wherein said first constant is hexadecimal B0.

11. The method of claim 10 wherein said second constant is hexadecimal B1.

12. The method of claim 11 wherein said third constant is hexadecimal 20.

13. The method of claim 9 wherein said first unit processes 24 bit words, and said second unit can process 32 bit words but does process 24 bit words.

* * * * *